United States Patent [19]
Derby

[11] 4,413,693
[45] Nov. 8, 1983

[54] MOBILE CHAIR

[76] Inventor: Sherwin L. Derby, 904 Susan Ct., O'Fallon, Ill. 62269

[21] Appl. No.: 248,405

[22] Filed: Mar. 27, 1981

[51] Int. Cl.[3] .............................................. B60K 7/00
[52] U.S. Cl. .................................... 180/74; 180/6.66; 180/21; 280/78
[58] Field of Search ........................ 180/74, 6.44, 6.66, 180/21, 316; 280/47.12, 78

[56] References Cited

U.S. PATENT DOCUMENTS

| | | | |
|---|---|---|---|
| 1,928,412 | 9/1933 | Deninson | 180/74 |
| 2,267,254 | 12/1941 | Reilley | 180/21 |
| 2,372,043 | 3/1945 | Aghnides | 180/21 |
| 3,037,570 | 6/1962 | Olson | 180/316 |
| 3,763,945 | 10/1973 | Danielson | 180/6.66 |
| 3,858,673 | 1/1975 | Browning | 180/74 |
| 3,920,093 | 11/1975 | Moron et al. | 180/21 |
| 3,938,608 | 2/1976 | Folco-Zambelli | 180/21 |

*Primary Examiner*—Joseph F. Peters, Jr.
*Assistant Examiner*—Ross Weaver
*Attorney, Agent, or Firm*—Kalish & Gilster

[57] ABSTRACT

A mobile self-propelled chair includes a frame having at its top a pivotally mounted passenger seat and captively mounting for rotation about various possible axes a relatively large sphere, which supports the principal weight of the chair and user. Auxiliary support is provided by casters surrounding the sphere. The frame has a battery and one or more drive motors for producing rotation of the sphere by drive roller engagement of the sphere surface. Posturally-effected movement of the seat actuates switches to provide power to the motor. Various arrangements allow orienting the axis of rotation of the sphere to cause turning the chair. Thus, both translation and turning movement of the chair is posturally controlled by the user.

11 Claims, 13 Drawing Figures

FIG. 1
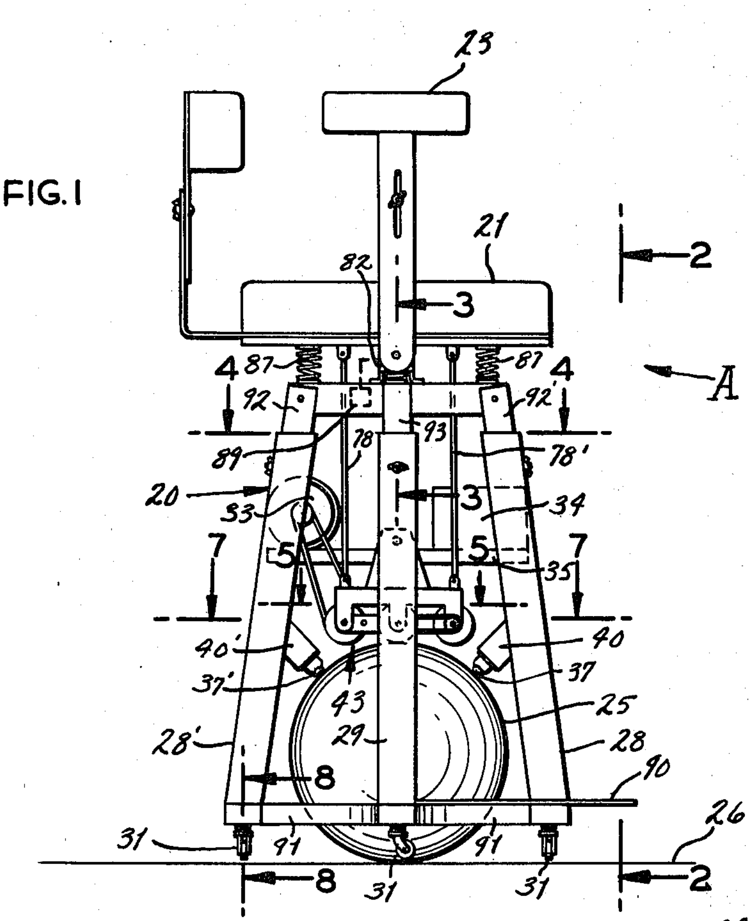
FIG. 5
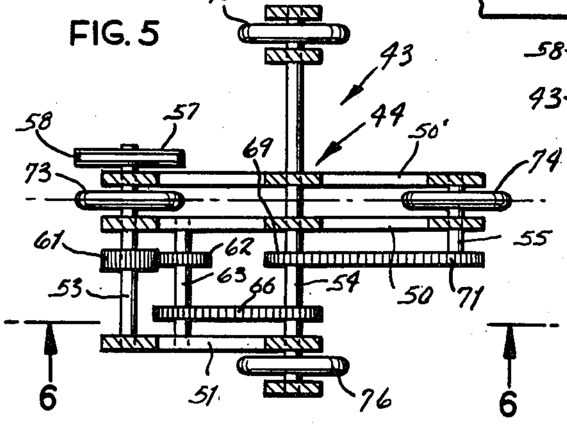
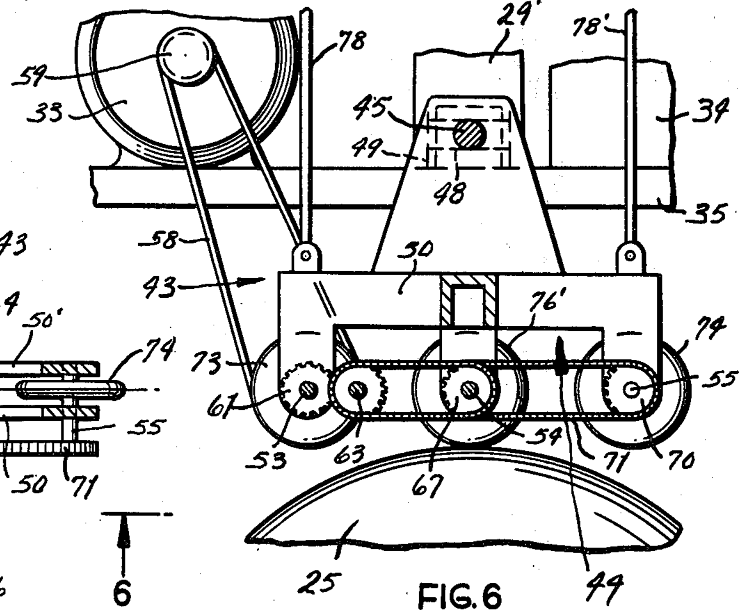
FIG. 6

FIG. 2
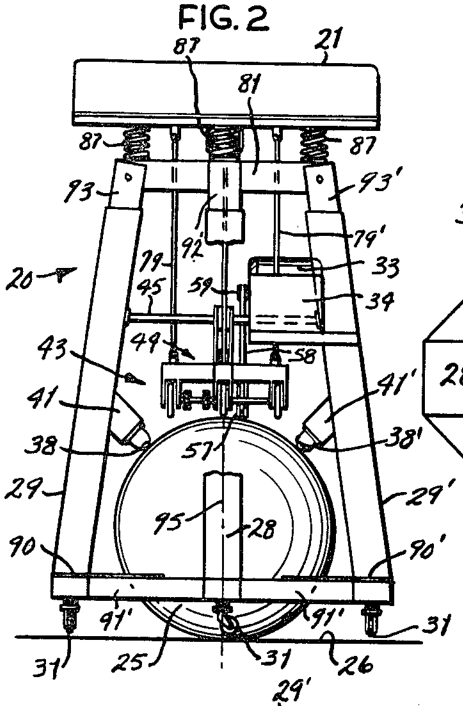
FIG. 4
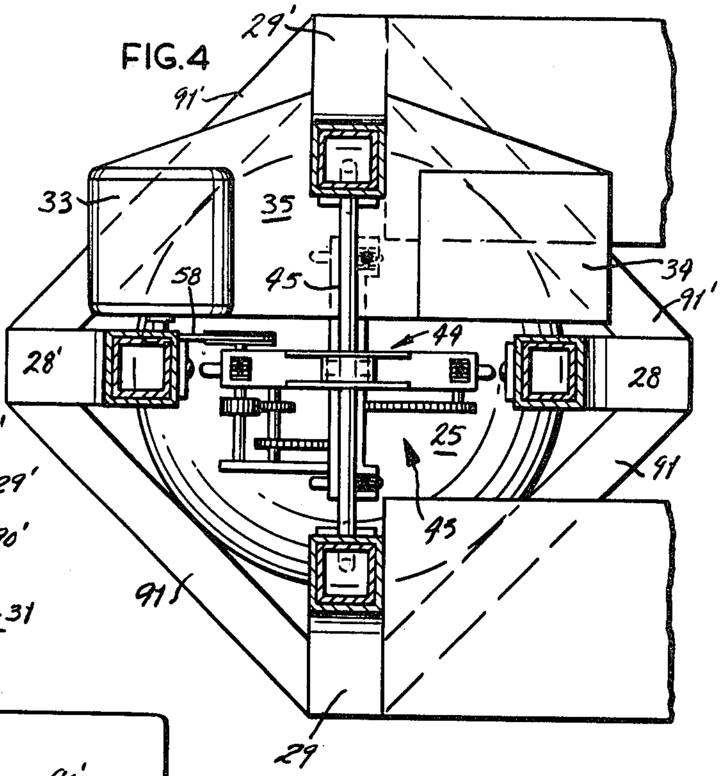
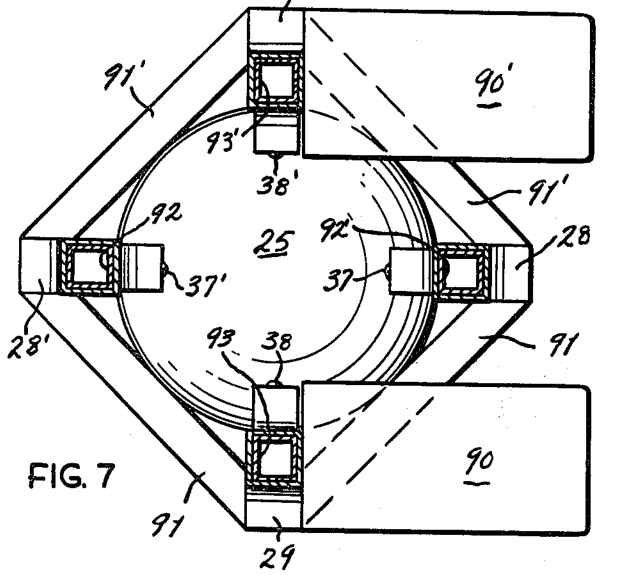
FIG. 7
FIG. 8
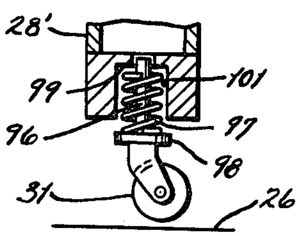
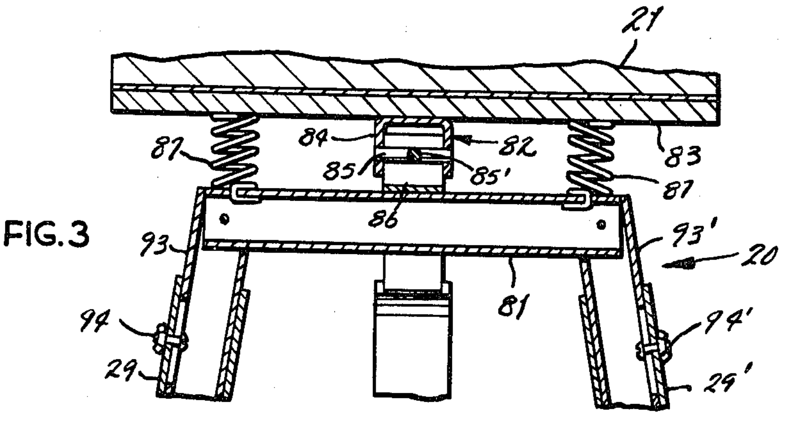
FIG. 3

MOBILE CHAIR

BACKGROUND AND SUMMARY OF THE INVENTION

This invention relates to mobile chairs and, more particularly, to an electrically driven mobile chair.

There have been known heretofore a variety of different self-propelled mobile chairs, including various types of electric wheelchairs controllable by the user in various ways, such as by operating a switch or steering control manually to control the supply of battery power to motors such as typically independent drive wheels at the sides of the chair.

For many purposes, such conventional electric wheelchairs are awkward and of such large size, complexity and cost as to render them essentially useless for certain situations, being poorly suited, for example, for use in closely confined quarters requiring close maneuvering and unable to shift sidewards or turn abruptly.

Further, there are many occupations and activities which require a person to be seated, such as in close proximity to a workbench, where it is desirable to be able to maneuver the chair toward and away from the work area and to turn the chair to one side or the other.

There are many individuals who have limited mobility or various disabilities which dictate the need for a highly maneuverable, self-propelled chair. It would also be desirable for such a mobile chair to be controlled other than by conventional hand-operated switches, steering arms or the like, so that one would not need to interrupt other manual activity.

Accordingly, it is an object of the invention to provide an improved self-propelled, self-contained mobile chair, and particularly, such a chair which is selectively driven by the user by postural shifting while seated upon the chair.

It is a further object of the invention to provide such a mobile chair which does not utilize conventional hand-operated switches, steering arms, or the like, and requires no manual operation of controls.

Another object of the invention is the provision of such a mobile chair which is extremely maneuverable and provides both translational and turning movement in response to such postural shifting.

A further object of the invention is the provision of such a mobile chair which provides a large surface area of contact with the surface upon which it is supported for improved weight distribution and efficient frictional rolling engagement of myriad surfaces.

Other objects of the invention include the provision of such a mobile chair which is light in weight and extraordinarily compact, which can maneuver in very close, confined areas, which is extremely easy to occupy and maneuver, and which requires little power for operation.

Briefly, a mobile chair of the invention comprises a frame carrying at its top a pivotally mounted passenger seat and captively mounting for rotation about various possible axes a relatively large sphere, which bears the principal weight of the chair and passenger. Auxiliary support is provided by casters surrounding the sphere. The frame has a battery and at least one drive motor for producing rotation of the sphere by means of a drive roller frictionally engaging the sphere. Postural movement of the seat provides power to the motor. Various arrangements allow sphere axis location for turning the chair.

BRIEF DESCRIPTION OF THE DRAWINGS

FIG. 1 is a side elevation of a first embodiment of a mobile, a self-propelled chair constructed in accordance with and embodying the present invention.

FIG. 2 is a front elevation of the chair of FIG. 1, as viewed along line 2—2 of FIG. 1.

FIG. 3 is an enlarged transverse cross-sectional view taken along line 3—3 of FIG. 1.

FIG. 4 is a horizontal cross-sectional view of the embodiment of FIG. 1, as taken along line 4—4 thereof.

FIG. 5 is a horizontal cross-sectional view of certain drive apparatus of the chair of FIG. 1, as taken along line 5—5 thereof.

FIG. 6 is a fragmentary cross-sectional view of portions of the drive apparatus of FIG. 5, as taken along line 6—6 thereof.

FIG. 7 is a horizontal cross-sectional view of portions of the mobile chair of FIG. 1 with a certain drive mechanism removed and taken along line 7—7 of FIG. 1.

FIG. 8 is a transverse cross-sectional view of a coaster feature of the new mobile chair, as taken along line 8—8 of FIG. 1.

Corresponding reference characters indicate corresponding parts throughout the several views of the drawings.

BRIEF DESCRIPTION OF THE PREFERRED EMBODIMENTS

Figure 9:
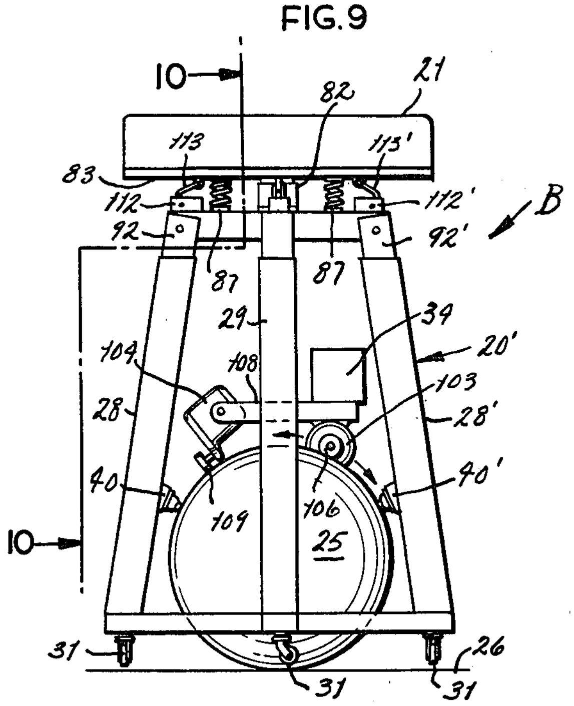
FIG. 9 is a side elevation of a second embodiment of the new mobile chair of the invention.

Referring now by reference characters to the drawings, indicated generally at A is a self-propelled mobile chair configured in accordance with a first embodiment of the invention. Chair A comprises a frame, generally 20, having a seat 21 pivotally mounted thereon, as more fully developed hereinbelow. As demonstrated, seat 21 may optionally have a back rest 22 and arm or side rest 23 for user comfort and for enhancing the user's degree of control over the chair by postural shifting in seat 21 when seated thereon.

Captively mounted for rotation within frame 20, as described below, is a spherical body 25 of rather substantial diameter. Sphere 25 is adapted to provide frictional rolling engagement with the support surface 26 upon which the chair is located and may be of a suitable synthetic material or of metal, such as stainless steel, coated with a synthetic resin material, and about the size of a bowling ball. Sphere 25 is substantially centered between four legs 28, 28' and 29, 29' which define principal members of the frame 20, whereby sphere 25 is vertically aligned with, i.e., centered beneath, the combined weight of chair A and a passenger, i.e., user, seated upon seat 21 and is intended primarily for carrying such combined weight. For purposes of orientation, leg 28 is at the front of the chair, leg 28' at the rear, so that when the user is seated upon the chair, the user would face to the right as viewed in FIG. 1.

Located at the lower end of each of legs 28, 28' and 29, 29' are respective casters 31, each of which may swivel freely upon a vertical axis. Casters 31 provide auxiliary support for the chair for stabilizing it and maintaining the center of gravity of the chair and the passenger substantially above sphere 25 which, accordingly, carries most of the composite weight of the chair and passenger. By their stabilizing function, casters 31 prevent the chair from tipping over.

Generally, the new mobile chair is adapted to provide not only selective translational movement, such as forward and rearward, but also selective turning to the left or right, all in response to postural shifting by the user upon seat 21.

Accordingly, the chair is provided with a prime mover which in embodiment A constitutes a single electric motor 33 of a low voltage DC type powered by a battery 34 of rechargeable type, such as preferably, the lead-acid or nickel cadmium type. Motor 33 is preferred to have speed reduction gears internally for providing, thus, a reduced output shaft speed suited for causing the chair to move at desired terminal velocity when the motor is fully energized. Motor 33 and battery 34 are carried by a suitable platform or support 35 secured appropriately to legs of the chair frame 20.

Sphere 25 is maintained in its position relative to the legs of frame 20 by roller units 37, 37' and 38, 38' which may themselves be merely ball-type casters rotatably mounted, as by ball bearing assemblies of conventional character, within fittings 40, 40' and 41, 41' secured to the legs, as by welding. Accordingly, sphere 25 is always rotatably fixed in position relative to frame 20 and presented for having its surface selectively engaged by a drive mechanism generally designated 43, the determined by the movement of seat 21 with respect to frame 20 in the manner described below in response to postural shifting of the user.

Referring now to FIGS. 4 and 5, drive mechanism 43 includes a frame, generally designated 44, which is rockably mounted upon a shaft 45 extending between legs 29, 29'. Frame 44 is also free to rock about an axis transverse to that of shaft 45 by virtue of suspension upon a cross shaft 48 to which frame 44 is secured by a gimbal 49.

Referring now primarily to FIGS. 5 and 6, frame 44 comprises at its lower end a plurality of spaced apart web portions or brackets, as at 50, 50' and 51, through which are journalled three shafts, 53, 54 and 55. Shaft 53 has affixed to it a pulley 57 driven by a belt 58 passing over a drive pulley 59 mounted upon the output shaft of motor 33. Accordingly, shaft 53 is driven, at a reduced speed, by a motor 33. Fixed upon shaft 53 is a drive pinion 61 engaging a driven pinion 62 carried upon a transverse shaft 63. Shaft 63 has affixed to it a sprocket carrying a chain belt 66 which passes around a corresponding sprocket 67 affixed to shaft 54. The latter shaft includes a further sprocket 69 for driving a sprocket 70, affixed to shaft 55, by a chain belt 71. It is thus apparent that shaft 55 turns in the direction opposite from shaft 53, as does shaft 54. Carried upon shafts 53 and 55 are drive rollers 73, 74, respectively, which may be of rubber or other elastomeric material for providing secure frictional rolling engagement with the surface of sphere 25. There are similarly carried upon shaft 54 at its opposite ends rollers 76, 76' of similar character. Accordingly, upon movement of frame 44 about the axis of either shaft 45 or cross shaft 48 any one of the four rollers 73, 74, 76 or 76' may be caused to contact the surface 25. Such movement of frame 44 is controlled by four rods, 78, 78' and 79, 79' which interconnect the lateral extremities of frame 44 with seat 21, pivotally interconnected with the frame as described below.

Referring particularly to FIG. 3, seat 21 is centrally mounted to a cruciform upper portion or support 81 of frame 20 by a gimbal 82 consisting of universally pivoted brackets being affixed to the lower surface 83 of seat 21. An upper bracket 84 of the gimbal is journalled upon a shaft 85 having perpendicular lateral extensions, as at 85' which are pivotally secured to a lower bracket 86. Thus, seat 21 is gimballed for movement either forward and backward or from side to side upon two perpendicular axes defined by gimbal 82. Compression springs 87 are positioned at the front and rear and opposite sides between upper surface of support 81 and lower surface 83 to provide a resilient restorative force centering the seat but permitting the user of the chair to tip the seat 21 either forward or backward or from side to side against the force of the springs by merely posturally shifting his weight in the direction he desires the chair to move. In so doing, the user causes corresponding fore and aft or side to side tipping of frame 44 of the drive assembly 43 to engage the surface of sphere 25 with the corresponding one of rollers 73, 74 or 76, 76'.

To provide power from battery 34 to motor 33 upon such desired movement of the chair, a conventional switch 89 which is merely conventionally connected in a series circuit between battery 34 and 33. Switch 89 is mounted in any suitable way for operating to be normally open when seat 21 is centrally positioned upon frame 20 (as shown in FIGS. 1 and 2) but to close for providing power to motor 33 upon any tipping of the seat by the user in any desired direction. For better chair control and user comfort, provided at the lower end of frame 20 are foot rests or support plates 90, 90' which are secured appropriately to legs 29, 29' and to bracing members, as at 91, 91', which latter interengage the legs at their lower extremities.

Preferably, the upper end of frame 20 is adapted for being selectively adjusted in height. For this purpose, extending from legs 29, 29' and 28, 28' in telescoping relationship are leg extensions 92, 92' and 93, 93' which may be pivotally interconnected with seat support member 87. These extensions may be clampingly secured to the legs to provide a desired seat height (FIG. 3), as by tightening wing nuts 94, 94'. The height of seat 21 may in this way be changed to accommodate persons of various heights, leg lengths, etc.

Accordingly, in operation, it is apparent that the user simply leans, i.e., shifts has posture in the desired direction of travel, producing a slight tipping of seat 21 against the centralizing force of springs 87. This tipping is coupled by rods 78, 78' and 79, 79' to drive unit frame 44 for causing driving engagement of sphere 25 by one of rollers 73, 74 or 76, 76', depending upon the desired direction of movement. As either of rollers 73, 74 will thus contact sphere 25 at points on a plane 95 which vertically bisects the sphere, while rollers 76, 76' will contact it on either side of such plane 95.

Thus, if the passenger desires to cause translational movement of the chair in the forward direction, he leans forward. This turns on motor 33 and brings roller 74 into contact with sphere 25 for counterclockwise rotation of the sphere about a horizontal axis, as viewed in FIG. 1, with consequent forward movement of the chair. Similarly, rearward translational movement is produced by leaning rearwardly in seat 21 against back rest 22.

Chair A can be caused to turn left or right by leaning left or right in seat 21. The shifting of posture is more effective when one's arms are used to apply weight to one of the arm rests, as at 23, in the desired direction of turn. For example, if the chair is stationary, it can be caused to rotate to the left by shifting of the posture left in seat 21 to cause roller 76' to engage the surface of sphere 25. This produces a rotation of the sphere about a vertical axis with the chair, accordingly, swiveling to the left. Similarly, postural shifting of weight to the right, as by placing weight upon arm rest 23, brings roller 76 into engagement with sphere 25 for producing turning to the right.

If the user desires to produce both translational and turning movement, he may shift posture in the desired direction of turn while leaning either forwardly or rearwardly to produce the desired translational movement. For example, to cause the chair to turn right while moving forward, the passenger will lean forward in seat 21 as well as shifting his weight to the right to cause rollers 74 and 76 to contact sphere 25 simultaneously. Such will produce a tipped axis of rotation for sphere 25 causing forward translational movement of the chair while causing it to skew or turn to the right.

Rollers 31 preferably are attached to the legs of frame 20 by a spring arrangement shown in FIG. 8, each caster 31 having a stem 96 about which is located a coiled compression spring 97 bearing against a flange 98 or stem 96 at its lower end, and at its upper end against a seat 99 defined by a recess 101 within the end of the frame leg, such as that designated 28'. Casters 31 are thus resiliently biased toward contact with surface 26 for causing chair A to be stably maintained upright. Casters 31 thus give stabilized support of frame 20 while allowing slight resilient tipping of the frame relative to surface 26 to accomodate surface irregularities even though the primary weight of the chair and user is centered over sphere 25.

Figure 10:
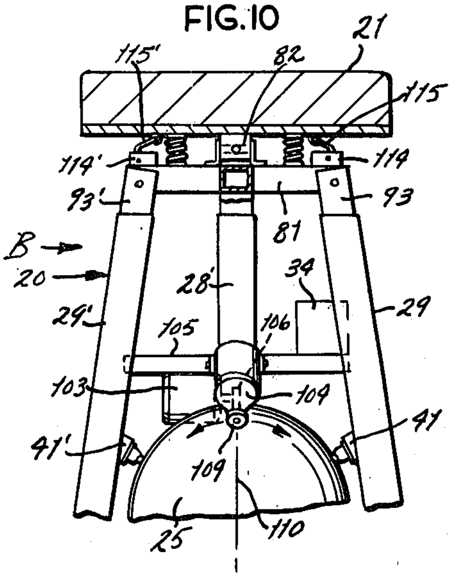
FIG. 10 is a fragmentary rear elevation thereof, as taken along line 10—10 of FIG. 9.

Referring now to FIGS. 9 and 10, a second embodiment of a self-propelled mobile chair of the invention is designated generally B. Chair B comprises a frame, generally 20', of the configuration very similar to that provided for chair A, having legs 28, 28' and 29, 29' with casters 31 at the lower ends of the legs as demonstrated in FIG. 8. A supporting structure 81 extends across the top of frame 20' for mounting seat 21 by a gimbal 82 as described in connection with embodiment A so that the seat is maintained in its centered position but is moveable or tippable about two axes of possible movement with respect to frame 20'. Seat 21 is maintained centered by springs 87 as previously described. Sphere 25 is held rotatably captive centrally within frame 20' by ball-type roller units 40, 40' and 41, 41' of preferably the same general configuration as previously described.

Chair B also includes a battery 34 but adapted for driving either of a pair of motors 103, 104 which, like motor 33, are of a low voltage DC type having internal speed reduction gears for providing a reduced output shaft speed. Motor 103 is affixed to a bracket or plate 105 extending between legs 29, 29' and includes a drive roller 106 affixed to its output shaft for rotating sphere 25 in either of directions shown by arrows by frictionally engaging the surface of sphere 25 at a point laterally centered beneath the legs 29, 29'; which respectively define the left and right sides of the chair, as viewed in FIG. 10. When contacting the sphere, roller 106 provides translational forward or rearward movement of the chair, such corresponding respectively to the right or left sides of FIG. 9.

Similarly, motor 104 is povotally interconnected with frame 20' by an extension 108 of plate 105 and includes a drive roller 109 affixed to its output shaft for contacting the surface of sphere 25 such that it will impart a rotational force to the surface of sphere 25 perpendicular to a plane which vertically bisects the sphere, as representatively indicated at 110, and which plane intersects the point of contact of sphere 25 by roller 106. Thus, dependent upon the direction of rotation of roller 109, sphere 25 will be caused to rotate in directions as illustrated by arrows in FIG. 10.

Motor 103 is preferably resiliently mounted to plate 105 such that it may impart rotational force in either direction to produce rotation for forward or rearward movement (as shown by arrows in FIG. 9), while at the same time not precluding rotation of the sphere in the direction shown by the arrows in FIG. 10. As will be apparent, such rotation as shown in FIG. 10 will cause a turning movement of the chair with respect to sphere 25, and with the chair rotating about a vertical pivot axis if motor 103 is not energized but causing the chair to veer to the left or right if the chair is being driven translationally either forward or rearward by motor 103.

Control of motor 103 is provided by forward and reverse movement control switches 112, 112' which may be of a microswitch, snap-action type having operating levers including roller contacts, as at 113, 113', bearing against the lower surface 83. Springs 87 maintain seat 21 level in the absence of postural shifting by the passenger, to keep switches 112, 112' in their normally open condition. These switches are connected in a manner understood by those skilled in the art with motor 103 so that, upon forward tipping or tilting of seat 21 with respect to frame 20', motor 103 will be driven in a direction for producing forward movement of the chair and with switch 112 remaining open. However, upon the passenger shifting his weight rearwardly upon seat 21, switch 112 closes and switch 112' remains open for causing battery voltage of opposite polarity to be applied to motor 103 for driving the chair in the reverse direction. Similarly, left and right turn movement control switches 114, 114' are located beneath seat 21 at the opposite sides of the chair, i.e., above leg extensions 93, 93', and have similar actuating arms 115, 115' adapted to cause the respective switch to change from its normally open condition to a closed circuit condition upon the seat depressing the respective switch arm. Switches 114, 114' are interconnected with motor 104 again in the same known manner as for motor 103, to produce rotation of the motor in one direction, i.e., for causing rotation of sphere 25 to the left as viewed in FIG. 10 for corresponding turning movement of the chair to the right. Similarly, upon the chair tipping to the opposite direction, such as the closing switch 114', battery voltage of opposite polarity will be applied to motor 104 for causing its rotation in the opposite direction for left turning of the chair.

Although seat 21 is shown without a back rest or arm rest, such may be provided, as in embodiment A. Similarly, foot rests 90, 90' of the type shown for embodiment A may also be utilized.

Figure 11:
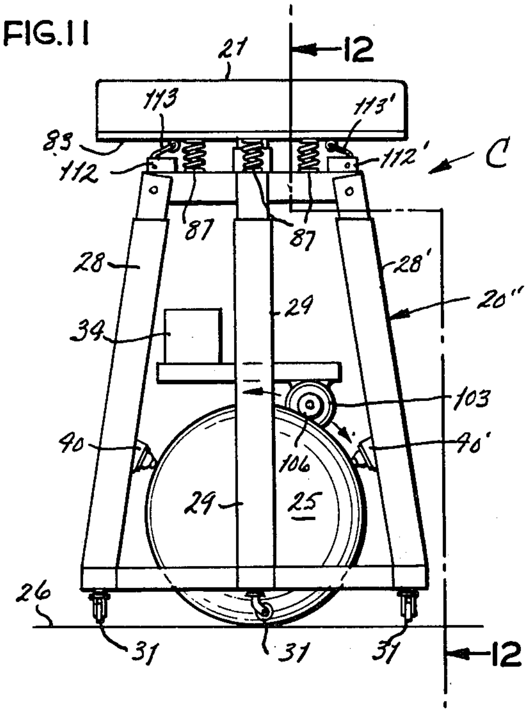
FIG. 11 is a side elevation of a third embodiment of the new mobile chair of the invention.
Figure 12:
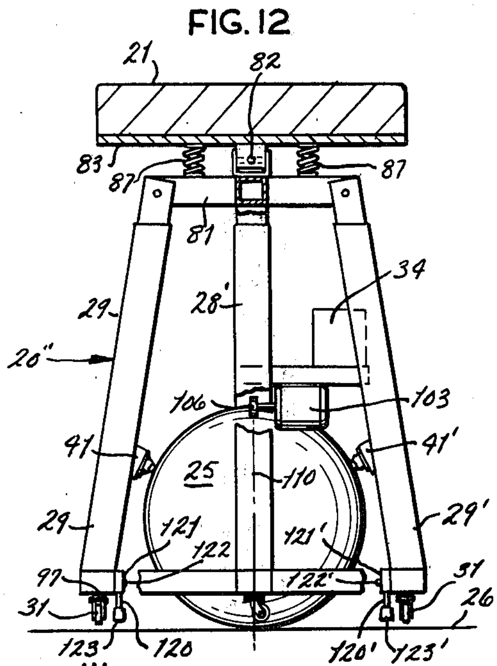
FIG. 12 is a front elevational of the mobile chair of FIG. 11, as taken along line 12—12 thereof and with certain portions being broken away.

Referring now to FIGS. 11 and 12, there is shown a third embodiment C of a mobile, self-propelled chair of the invention incorporating but a single motor 103 suspended from a platform 118 and including, as in embodiment B, a drive roller carried by the reduced speed output shaft of motor 103. Said support or shelve 118 supports also battery 34. As in embodiment B, seat 21 is mounted by a gimbal 82 upon seat support 81, and is maintained in a centered position by springs 87, all as before described. With respect to the orientation of embodiment C, it is viewed from the right side as seen in FIG. 11 and from the front, as seen in section in FIG. 12. Drive roller 106 is located for contacting sphere 25 at a point which lies in a plane 110 bisecting sphere 25 from front to rear. Sphere 25 is held rotatably captive with respect to frame 20' of this embodiment by roller units 40, 40' and 41, 41'.

There are provided only two switches 112, 112' having respective actuating arms 113, 113' which contact the lower surface 83 of seat 21. Both such switches are normally open in the position illustrated. However, if the passenger should shift his weight forward, switch 112' will close and switch 112 remain open. Conversely, postural shifting moving the weight of the passenger rearwardly will close switch 112 and switch 112' will remain in its normally open circuit condition.

Motor 103 is interconnected with switches 112, 112' as in the embodiment of FIGS. 9 and 10 for being provided with battery voltage of one polarity upon closure of switch 112' for causing ortation of the sphere 25 to cause translational forward movement of chair C. Upon rearward tipping of the seat 21 with respect to frame 20', switch 112 closes to provide opposite voltage polarity to motor 103 for providing rotation of drive roller 106 in the opposite direction to move the chair rearwardly.

Turning control of the chair of FIGS. 11 and 12 is provided by short extensions 120, 120' which are adjustably secured to the lower ends of legs 29 as by respective sleeve fittings 121, 121', each having a set screw 122, 122', for clampingly engaging the respective extension. Each of extensions 120, 120' is also provided with a tip 123, 123' preferably of elastomeric material having a frictional characteristic for draggingly engaging surface 26 upon which chair C stands. Said extensions 120, 120' are adjusted in length by the set screws to provide a small clearance between the respective tip 123, 123' and surface 26 when the casters 31 contact surface 26 when so urged by a spring 96 of the assembly as demonstrated in FIG. 8. Although the respective caster 31 comes into contact with said surface 26, increasing transfer of weight by the passenger by tipping movement to the side causes the spring 96 of the caster assembly to bring the caster 31 up into its respective recess and thereby bring the corresponding extension tip 123, 123' into contact with surface 26.

When drive motor 103 is provided with electric power by virtue of either switch 112 or 112' being closed, the respective extension 120, 120' will, accordingly, cause the chair to be frictionally impeded upon one side or the other and thereby cause the chair to turn in the direction of whichever tip 123, 123' drags across surface 26. With even greater application of weight, the tip will even more firmly grippingly engage surface 26 and cause the chair to pivot sharply about such tip for rapid turning.

In this way, the user of embodiment C, as is previous embodiments, is provided with postural control over the chair by the expedient of merely shifting weight in the desired direction of travel, whether such be forward or backward or to either side, all without requiring use of the hands and without resort to the user exerting leverage against the supporting surface 26 with his legs.

Because of the ease of control, the new mobile chair is of extreme utility and of great advantage to those with limited motion of the legs or those who would find it difficult to exert leverage against the support surface upon which a conventional caster-equipped stool, for example, would be located.

Figure 13:
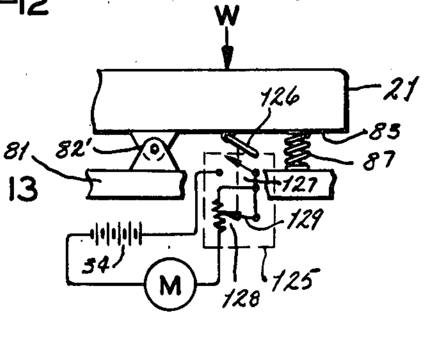
FIG. 13 is a simplified schematic illustration of certain circuitry of the invention useful for controlling a drive motor in response to postural shifting of a seat of the chair.

FIG. 13 is demonstrative of a simple circuit arrangement for allowing selective application of power to a drive motor of the invention, whether such motor be used for producing translational movement (as in embodiment C) or turning movement (as in embodiment B). Seat 21 is shown to be pivotally mounted by a bracket 82' to a support surface 81 of a frame of the new chair but compression spring 87 maintains the orientation of seat 21 shown in FIG. 13 in the absence of weight causing further compression of such spring. Indicated schematically at 125 is a switch device having an operating arm 126 for engaging the lower surface 83 of the seat. Said device 125 includes a normally open set of contacts 127 connected in a series circuit including battery 34 and a motor M representative of any one of the motors of the previously described mobile chair embodiments, said series circuit further including a rheostat resistance element 128 upon which a wiper 129 is slidable in response to downward movement of actuating arm 126. The application of the weight W, as shown, of a passenger upon seat 21 will move actuating arm 126 downwardly first to close contacts 127 and then to decrease the effective resistance provided by element 128 in the series circuit thereby to increase the current permitted to flow through motor M and proportionately increase its speed. This arrangement allows increasing posturally-applied weight of the passenger to provide increasing speed of movement, whether translational or turning, of a mobile chair of the invention.

Advantageously, switches of any embodiments may control a motor indirectly by relays rather than directly, as shown for simplicity.

In view of the foregoing, it is seen that the several objects of the invention are achieved and other advantageous results are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A compact mobile self-propelled chair including a frame carrying a passenger seat and a prime mover and characterized by a spherical body for carrying at least in part the weight of said chair and passenger and providing frictional rolling engagement with a support surface, means for captively mounting said spherical body for rotation relative to said frame about a plurality of axial orientations, drive means for interconnecting said spherical body and said prime mover for driving rotation of said spherical body, and control means responsive to postural shifting by said passenger for controlling the axial orientation during rotation of said spherical body for thereby determining the direction of movement of said chair, said spherical body being substantially centered beneath the combined weight of said chair and passenger for primarily carrying said combined weight, and auxiliary support means providing rolling engagement with said support surface around said spherical body for providing stablizing auxiliary support of said combined weight, said prime mover comprising a first electric motor and first switch means operatively associated with said seat for selectively controlling the provision of said electric power to said electric motor, said source of power comprising a battery carried by said chair, said first switch means being operative in response to postural shifting by said passenger in a desired direction of translational movement to supply electric power from said battery to said motor, said control means comprising means carried by said frame for providing selective frictional engagement of said chair with said support surface upon postural shifting by said passenger in a desired direction of turning movement for causing rotation of said spherical body about an axis producing turning of said chair.

2. A mobile chair according to claim 1 and further characterized by said auxiliary support means comprising a plurality of casters positioned around said spherical body, springs associated with said casters for resiliently urging said casters into ground contact, and friction producing devices associated with respective casters for providing said frictional engagement in response to increased weight upon a caster upon postural shifting of said passenger.

3. A mobile chair according to claim 1 and further characterized by a second electric motor, further drive means for selectively interconnecting said second electric motor with said spherical body for driving rotation thereof, said control means comprising a second switch means operatively associated with said seat for selectively controlling the provision of said electric power from said source of electric power to said second electric motor, said first electric motor producing rotation of said spherical body about a first axis orientation for translational movement of said chair, said second electric motor producing rotation of said spherical body about a shifted axis orientation for turning movement of said chair.

4. A mobile chair according to claim 3 and further characterized by said first axis orientation being horizontal, said shifted axis being other than horizontal.

5. A mobile chair according to claim 3 and further characterized by said first switch means being operative in response to passenger postural shifting of said seat either forward or rearward with respect to said frame, said second switch means being operative in response to passenger postural shifting of said seat from side to side with respect to said frame.

6. A mobile chair according to claim 5 and further characterized by said first switch means comprising forward and reverse movement control switches each having normally open contacts interconnected with said first motor but closing in response to respective forward or reverse posturally-effected tipping movement of said seat to provide one polarity or the opposite polarity voltage of said battery to said first motor, said second switch means comprising left and right movement control switches, each having normally open contacts interconnected with said second motor but closing in response to respective left or right posturally-effected tipping movement of said seat to provide one polarity or the opposite polarity voltage of said battery to said second motor.

7. A mobile chair according to claim 6 and further characterized by said forward, reverse, left and right movement control switches being each separately and respectively located beneath said seat proximate the front, rear, left and right edges thereof, and further comprising spring means for resiliently urging said seat to a centered position maintaining all of said control switches in normally open contact condition in the absence of postural movement of said seat.

8. A compact mobile self-propelled chair including a frame carrying a passenger seat and a prime mover and characterized by a spherical body for carrying at least in part the weight of said chair and passenger and providing frictional rolling engagement with a support surface, means for captively mounting said spherical body for rotation relative to said frame about a plurality of axial orientations, drive means for interconnecting said spherical body and said prime mover for driving rotation of said spherical body, and control means responsive to postural shifting by said passenger for controlling the axial orientation during rotation of said spherical body for thereby determining the direction of movement of said chair, said spherical body being substantially centered beneath the combined weight of said chair and passenger for primarily carrying said combined weight, and auxiliary support means providing rolling engagement with said support surface around said spherical body for providing stablizing auxiliary support of said combined weight, said prime mover comprising a first electric motor and first switch means operatively associated with said seat for selectively controlling the provision of said electric power to said electric motor, said source of power comprising a battery carried by said chair, said first switch means being operative in response to postural shifting by said passenger in a desired direction of translational movement to supply electric power from said battery to said motor, said seat being posturally shiftable by the passenger relative to said frame, said control means comprising a roller drive mechanism including a plurality of rollers adapted for selective frictional engagement of said sphere in driving relationship, means interconnecting said rollers with said motor for producing rotation of said rollers, and means interconnecting said drive mechanism and said seat for causing selected ones of said rollers to frictionally engage said sphere at locations for producing corresponding rotation of said sphere about an axial orientation for movement of said chair in a direction corresponding to postural shifting of said seat.

9. A mobile chair according to claim 8 and further characterized by said drive mechanism comprising forward and reverse drive rollers turning in opposite directions, said drive mechanism being pivotally mounted relative to said frame to selectively being either of said forward and reverse drive rollers into engagement with said sphere at points lying on a vertical plane bisecting said sphere for corresponding forward or reverse translational movement of said chair.

10. A mobile chair according to claim 9 and further characterized by said drive mechanism comprising left and right turn movement drive rollers, said drive mechanism being pivotally mounted relative to said frame to selectively bring either of said turn movement drive rollers into engagement with said sphere at points on opposite sides of said plane for respective left or right turning movement of said chair.

11. A mobile chair according to claim 1 and further characterized by said seat being pivotally connected to said frame, spring means resiliently urging said seat toward a centered position relative said frame, said seat being selectively displaceable from said centered position in response to postural shifting of said passenger, and an electric current control device connected in a circuit with said battery and motor and operating to increase the current provided to said motor from said battery upon increased selective displacement of said seat from said centered position.

* * * * *